US008521353B2

(12) United States Patent
Reltomaa et al.

(10) Patent No.: US 8,521,353 B2
(45) Date of Patent: Aug. 27, 2013

(54) SYSTEM FOR MEASURING THE PERFORMANCE OF A FOREST MACHINE

(75) Inventors: Arto Reltomaa, Tampere (FI); Aki Putkonen, Tampere (FI); Kari Lehmusvaara, Tampere (FI); Timo Käppi, Nokia (FI)

(73) Assignee: John Deere Forestry Oy, Tampere (FI)

( * ) Notice: Subject to any disclaimer, the term of this patent is extended or adjusted under 35 U.S.C. 154(b) by 759 days.

(21) Appl. No.: 11/921,395

(22) PCT Filed: May 12, 2006

(86) PCT No.: PCT/EP2006/062288
§ 371 (c)(1),
(2), (4) Date: Dec. 2, 2009

(87) PCT Pub. No.: WO2006/128786
PCT Pub. Date: Dec. 7, 2006

(65) Prior Publication Data
US 2010/0065155 A1 Mar. 18, 2010

(30) Foreign Application Priority Data
May 30, 2005 (FI) .................................... 20055266

(51) Int. Cl.
G06F 19/00 (2006.01)
A01G 23/08 (2006.01)

(52) U.S. Cl.
USPC ............. 701/29; 701/50; 144/335; 144/34.1; 144/336; 703/2; 198/570; 193/25 E

(58) Field of Classification Search
USPC .................... 701/29, 50; 144/335, 223, 336, 144/34.1; 703/2; 198/570; 193/25 E
See application file for complete search history.

(56) References Cited

U.S. PATENT DOCUMENTS

| 4,015,366 | A  | * | 4/1977 | Hall, III ....................... 47/1.43 |
| 4,715,012 | A  |   | 12/1987 | Mueller, Jr. |
| 5,463,567 | A  |   | 10/1995 | Boen et al. |
| 6,382,274 | B1 | * | 5/2002 | Hicks ........................... 144/34.1 |
| 7,034,710 | B2 | * | 4/2006 | Falada et al. .................. 340/679 |
| 7,035,768 | B2 | * | 4/2006 | Matsuda ....................... 702/184 |
| 7,113,839 | B2 | * | 9/2006 | Ferguson et al. ............. 700/115 |
| 2002/0008075 | A1 |   | 1/2002 | Handroos et al. |
| 2002/0099520 | A1 |   | 7/2002 | Falada et al. |
| 2003/0114965 | A1 |   | 6/2003 | Fiechter et al. |

(Continued)

FOREIGN PATENT DOCUMENTS
EP 0458107 B1 10/1994
GB 2305045 A 3/1997

OTHER PUBLICATIONS
European Search Report, dated Apr. 1, 2009, 4 pages.

(Continued)

Primary Examiner — Ronnie Mancho

(57) ABSTRACT

A system and a method for monitoring the performance of a subsystem of a forest machine. The method comprises the steps of: collecting data relating to the function of said subsystem or the performing of said function; determining one or more characteristic values to describe the performance continually according to data; and monitoring the variation of said one or more characteristic values in time, wherein, for example, the variation of said one or more characteristic values in time is displayed in the form of a graphic presentation to the user.

25 Claims, 8 Drawing Sheets

(56) References Cited

U.S. PATENT DOCUMENTS

| | | |
|---|---|---|
| 2004/0025090 A1 | 2/2004 | Miller |
| 2004/0250908 A1* | 12/2004 | Hicks .......................... 144/335 |
| 2005/0096810 A1 | 5/2005 | Mahoney et al. |

OTHER PUBLICATIONS

International Search Report for PCT/EP2006/062288, (4 pages), (Jul. 26, 2006).

Written Opinion of the International Searching Authority for PCT/EP2006/062288, (5 pages).

Finnish official Action dated Oct. 27, 2009 (6 pages).

English Translation of Office Action in Counterpart Russian Patent Application No. 2007149051 (Office Action from Russian Patent Office on Jul. 14, 2010) (2 pages).

Communication from European Patent Office in European Patent Application No. 06 763 141.6 (4 pages)(Apr. 1, 2009).

Finnish Office Action for Finnish Patent Application No. 20125617, and Corresponding English Translation (12 pages) (Feb. 28, 2013).

* cited by examiner

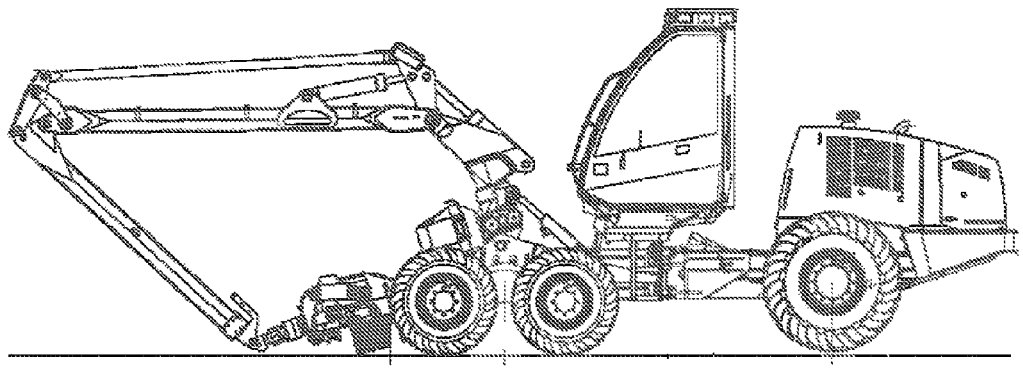
- Prior Art -    Fig. 1
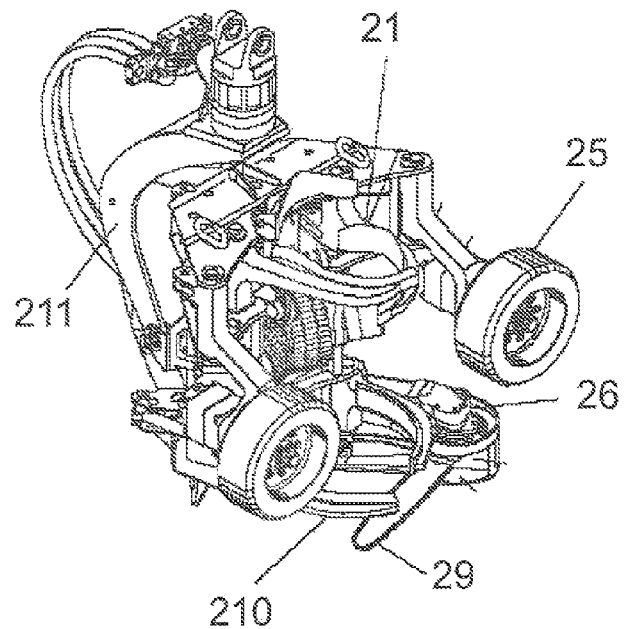
Fig. 2

SYSTEM FOR MEASURING THE PERFORMANCE OF A FOREST MACHINE

The disclosures of the following patent applications are hereby incorporated by reference herein: International Patent Application No. PCT/EP2006/062288 and Finnish Patent Application No. 20055266.

TECHNICAL FIELD OF THE INVENTION

The invention relates to a method and a system for monitoring the function of a subsystem or the performance of one or more functions in a forest machine. The invention also relates to a computer program relating to the method, and a computer software product.

BRIEF DESCRIPTION OF THE DRAWINGS

In particular, according to one embodiment, the invention relates to the condition monitoring of the sawing function of a harvester.

In particular, according to another embodiment, the invention relates to the condition monitoring of the feeding function of the harvester.

Figure 3:
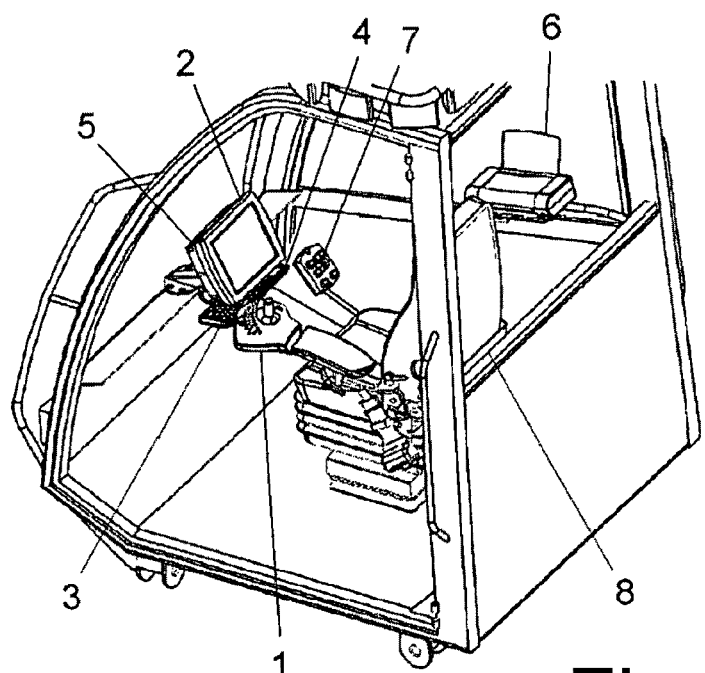

In particular, according to another embodiment, the invention relates to the condition monitoring of the grapple processor of the harvester.

In particular, according to another embodiment, the invention relates to the monitoring of the output of the forest machine.

In particular, according to another embodiment, the invention relates to the monitoring of the fuel consumption of the forest machine.

In particular, according to another embodiment, the invention relates to the monitoring of the condition of the hydrostatic drive transmission of the forest machine.

In particular, according to yet another embodiment, the invention relates to the monitoring of the function of the crane system of the forest machine.

BACKGROUND OF THE INVENTION

It is known that forest machines include various harvesters, forwarders and combinations of these, which are also called combi machines. In this description, such combi machines are also included when harvesters are mentioned, if the function in question is similar to the function in a harvester. It is known that control systems are used for controlling the forest machines. One control system of prior art is Timberjack Timbermatic 300, which is a system for controlling the functions of a forest machine and particularly a harvester head, and for measuring and bucking of timber. In the forest machine, the control system controls, among other things, the diesel engine, the hydrostatic drive transmission, the harvester head and the crane system, to which the harvester grapple is coupled, as well as all the auxiliary functions related to these. The control system in question operates, for example, in the PC/Windows 2000 operating environment. In the bucking instructions of the control system it is possible to include, for the timber to be processed, for example value, distribution and colour marking matrices, groups of types of timber, and trunk types. By means of an application included in the Timbermatic 300 system, it is possible to analyze and compute the production results, such as the number, length and diameter of logs, the distribution levels, the groups of types of timber, and the trunk types.

The control system controls, for example, the harvester grapple in such a way that the control of the feeding of a log will automatically adjust the feeding speed and the pressure of the feed rolls and the delimbing blades, and that an anti-slip function will prevent the slipping of the feed rolls and make it possible to stop the tree trunk accurately for the sawing.

The display and the central processing unit of the control system are placed in the cabin, within reach for the driver. Normally, the system also comprises a printer.

The control bus in the control and measuring automatics of the control system is based on a CAN bus solution of prior art, in which data is passed in digital form. In the control bus, measurements and signals are transmitted in a way known as such. On the basis of the data, it is possible to monitor measurements relating to the duration and functional speeds of different steps in the processing. From the signals and measurements, information is obtained about the functional times and timings of components responsible for various functions. The components may be, for example, for the functions of the crane system or the harvester head connected to it, such as feeding, diameter measurement, length measurement, sawing, and delimbing. The processing of a single tree trunk involves a large number of measurement values that may be stored in a database which further comprises a classification, for example, on the basis of size classes of trunks and logs. The size class of the trunk is known on the basis of the measurement values.

Reduced technical performance of a forwarder, a harvester, or a harvester grapple, both in the overall system and its subsystems and constituent functions, will impair the profitability of the harvesting work. It has been difficult to detect a long-term reduction in the performance, because it has been based on, for example, the subjective evaluations and experiences by the operator or the maintenance personnel and servicemen, which may be limited in time and relate to some individual forest machines only. Furthermore, it has been impossible to evaluate effects caused by repair and change works or changes in working methods in a reliable way.

For example, it has not been previously possible to monitor the condition of the sawing function or the feeding function of a harvester in a reliable way. In solutions of prior art, for example the sawing times are compared with fixed alarm limits, and when the limit is exceeded, a warning message is displayed to the driver. However, the performance of the sawing system or, on the other hand, of the feeding function is one of the most important factors on the output of the harvester. Reduced performance will reduce the profitability of the harvesting work, and if continued, a failure may result in subsequent damage that is worse than before, and in a production break.

Moreover, it has not been previously possible to monitor the condition of stem holding by the harvester grapple. Stem holding by the harvester grapple is an important factor on the output as well as on the measuring accuracy of the harvester. Impaired stem holding will reduce the profitability of the harvesting work. For example, if the clamping by the delimbing blades is insufficient, the tractive force of the bed rolls will not be transmitted efficiently to the trunk, and on the other hand, the accuracy of measurement of the diameter will be impaired. The accuracy of measuring the length will also be impaired, because contact faults between the measuring reel and the trunk will increase. If the clamping by the delimbing blades is too tight, the frictional force between the blades and the trunk will become too great. Thus, the feeding speed and output of the grapple will reduce, and the fuel consumption will increase.

It has not been previously possible to measure the output of a forest machine in such a way that the measurement would be useful in the monitoring of the performance and particularly the condition of the forest machine. A sufficiently high output of the harvester, that is, a large quantity of timber processed in cubic meters per hour ($m^3/h$), is a basic requirement for economically viable mechanized harvesting. However, the output of the harvester may be reduced for a number of reasons, such as malfunctions or machine settings that are not suitable for the conditions.

Furthermore, it has not been previously possible to measure the fuel consumption of a forest machine in such a way that the measurement would be useful for monitoring the condition of the machine. Previously, a direct consumption per hour has been measured, which is not sufficient for evaluating the condition of the forest machine and for monitoring the performance in long term.

As to the drive transmission of the forest machine, i.e. the forwarder and the harvester, the number of operating hours has been monitored, which is, however, not sufficient for monitoring the condition and determining the need for maintenance more closely. Similarly, it has not been possible to monitor the condition of the crane system of the harvester or forwarder sufficiently accurately.

SUMMARY OF THE INVENTION

The method according to the invention is presented in claim 1. The system according to the invention is presented in claim 20. The computer software product according to the invention is presented in claim 18.

The invention relates to the measurement of the condition or a characteristic value for the performance of one or more subsystems in a forest machine, and to presenting the result to the operator. Each measurement function involves the filtering of interference data case by case and the processing of data to a reliable characteristic value that can be utilized in the maintenance and optimization of the performance of the machine.

The computation of the characteristic values is typically performed in four steps: the measurement, the deletion of abnormal measurement values, the classification and compensation of the measurement data, and the computation of the characteristic value. After the characteristic value has been computed in real time, the result is stored, and the user may later view the time history of the characteristic value for a desired period. The subsystems of the forest machine to be examined in the invention include, for example, the hydrostatic drive transmission system, the crane system, the harvester sawing function, the harvester feeding function, and the stem holding function of the harvester. The characteristic values for the performance to be examined are the output and the fuel economy of the harvester.

By means of the invention, it is now possible to monitor the technical performance of forest machines, such as forwarders, harvesters and harvester grapples, and the monitoring of a trend in long term, i.e. the variation in time, can be implemented by utilizing index value measurements of different constituent functions of the forest machine. The monitoring is implemented by storing sufficient history data or by displaying the variation graphically or in the form of numerical data, or by retrieving the history data for an analysis. By means of the invention, it is possible to compare data relating to the carrying out of a function and performance data, measured in different operating conditions of the forest machine, because the index values to be determined can be made independent of variable factors, if desired. The index values can be used to display the most essential information in a very compact form; in other words, an overall view of the performance of the machine can be retrieved from multivariate measurement data and a large number of single measurements. The index used as the characteristic value is determined repeatedly, wherein it is determined, for example, at given intervals, when certain conditions are met, or for example when a sufficiently large processing quantity or number of logs is fulfilled. The data is utilized in the system for monitoring the condition of the forest machine, and the illustrative, comprehensive and detailed nature of the data provide an excellent basis for expert evaluations on what is the performance of the forest machine in question, where possible problems might occur, and what should be done to improve the performance.

Particularly when the performance of the forest machine is measured, another special problem is the dependence of the measurement values on the working conditions and the driver's driving style. Even these problems can be solved by the invention.

The developed measuring and computing method produces a characteristic value indicating the overall performance of, for example, the sawing system or the feeding function (SAWING INDEX, FEEDING INDEX). The sawing system consists of a system formed by, for example, a diesel engine, a driving pump, a sawing motor, and a chain saw. Changes in the value of the characteristic value that is continuously updated indicate changes in the technical condition of the sawing system or the feeding function.

Furthermore, the developed measurement and computing method produces a characteristic value indicating how well the trunk to be processed has remained in the grip of the grapple. Changes in the value of the characteristic value that is continuously updated indicate technical problems in the function of the delimbing blades supporting the trunk. Too high an index indicates too low a clamping pressure of the blades, and a low index indicates too high a clamping pressure.

Furthermore, the developed measuring and computing method produces a characteristic value that indicates reliably the level of the fuel consumption of the forest machine (FUEL CONSUMPTION INDEX) or the output of the harvester (MACHINE PRODUCTIVITY INDEX) in normal harvesting work. Changes in the value of the characteristic value that is continuously updated indicate changes in, for example, the technical fuel economy.

Furthermore, the invention provides an index for the condition of the drive transmission of both a harvester and a forwarder, indicating, for example, the ratio between the required rotation speed of the hydraulic motor and the realized rotation speed. The drive transmission system typically comprises a hydraulic motor and a hydraulic pump operating in a closed system. By monitoring the load distribution, relative changes in the drive transmission and the need for maintenance are detected. History data are an important source of information in unexpected events of malfunction.

Furthermore, the invention provides an index indicating the performance of the crane system, describing the function of the crane system either in the forwarder or the harvester.

Thanks to the invention, reduced performance is detected as early as possible. The performance can be restored to an acceptable level faster than before, and the mean output of the machines will increase. Repair work can be performed proactively in connection with normal servicing, and the increase in the utilization rate thus obtained will also increase the average output.

Thanks to the invention, faults in stem holding are detected as early as possible, and the causes can be fixed immediately.

The performance can be raised to an acceptable level sooner than before, and the average output and the average measuring accuracy of the machine will be improved.

Thanks to the invention, increased fuel consumption or impaired output will be detected as early as possible. The fuel economy or the output can be restored to an acceptable level sooner than before, and the operating costs of the machine will be reduced. The repair work can be performed in advance, and the utilization rate will be increased.

The sawing system or the feeding function of the harvester are subjected to a number of natural interference factors including, for example, variation in the hardness of the timber and variation in the temperature of the hydraulic oil (particularly the sawing system), or variation in the size of trunks to be processed (particularly the feeding function). Due to large natural variations in the performance, it is difficult to monitor the feeding function, and a reliable evaluation of the condition of the sawing system has not been possible by prior art solutions for monitoring the sawing time. In the monitoring solutions of prior art, the driver or serviceman has not been able to view the performance history of the sawing system. The review of the performance history, enabled by the invention, is an important requirement for efficient troubleshooting and repair work.

Due to large natural variations in the performance, it is also difficult to monitor the condition of the feeding function. The monitoring of the condition is further complicated by the many steps of the feeding function (acceleration, feeding at a constant speed, braking step, and feeding to the cross-cutting point) and the various factors of natural interference relating to these steps, which must be compensated for. The invention enables a useful solution for monitoring the condition of the feeding that is capable of monitoring the overall efficiency of the feeding as well as the successful performance of the partial steps.

Stem holding by the harvester head is subjected to a number of natural interference factors, such as variations in the size of trunks to be processed, variation in the branchiness, and pressure variations in the hydraulic system of the machine. Due to the many interference factors, it is difficult to monitor the condition of stem holding. The invention makes the monitoring possible also in this respect.

The output of the harvester is affected by a number of natural interference factors, such as the size of trunks to be harvested, the terrain conditions, and the skills of the driver. Due to large natural variations in the consumption, a reliable evaluation of the condition of the machine is not possible with the monitoring solutions of prior art. In the monitoring solutions of prior art, the driver or a serviceman cannot view the time history of the output. The review of the time history of output is an important requirement for efficient troubleshooting and repair work.

The fuel consumption of the forest machine is affected by a number of natural interference factors, such as the size of trees to be harvested and the terrain conditions. Due to large natural variations in the consumption, a reliable evaluation of the condition of the machine is not possible with the monitoring solutions of prior art. In the monitoring solutions of prior art, the driver or a serviceman cannot view the time history of the fuel consumption. The review of the consumption history, enabled by the invention, is a requirement for efficient troubleshooting and repair work.

In the various embodiments, the invention comprises the real-time computation of e.g. a sawing or feeding performance characteristic value, a fuel consumption characteristic value, a crane system performance characteristic value, a drive transmission condition characteristic value, or an output characteristic value; the storing of the characteristic value; and the displaying of the performance history to the operator. The measuring, the computing and the displaying of the results are executed in a PC belonging to the control system of the forest machine.

In the various embodiments, the invention also comprises the real-time computing of a stem holding characteristic value, the storing of the characteristic value, and the displaying of the performance history to the operator. The measuring, the computing and the displaying of the results are executed in modules belonging to the control system of the machine.

In its general form, the method according to the invention comprises computing the desired characteristic value in real time, storing the characteristic value, and displaying the performance history to the operator. The measuring, the computing and the displaying of the results are executed in modules belonging to the control system of the machine.

A particular advantage is that the implementation of the various embodiments of the invention does not require the inclusion of new sensors or computing modules in the machine, if this is not desired. By the inclusion of new sensors, it is also possible to monitor objects which are normally not included in the monitoring by the control system of the forest machine but which may be relevant to the condition monitoring.

In some embodiments, the system and method according to the invention use basic measurement data on the sawing time, the feeding function or the fuel consumption, which are subject to interference, or measurement data obtained from the control system bus of the harvester for determining the output, to process a reliable performance characteristic value which can be used as basis for repair measures. This is not possible by means of prior art solutions for monitoring the sawing function, the feeding function or the fuel consumption. Moreover, the prior art methods do not enable the monitoring of output. Further, the use of the invention is made more efficient by storing the characteristic values in a memory and displaying the performance history to the operator.

In one embodiment, the computation method according to the invention uses the basic measurements of the diameter and the length to process a stem holding characteristic value which can be used as a basis for repair measures and the adjustment of grapple settings. This is not enabled by any monitoring solution of prior art.

The most important feature of the graphical representation of the characteristic value history according to the various embodiments of the invention is that it is illustrative to the operator. The index history can be displayed graphically in a variety of ways.

The indices developed in the various embodiment examples of the invention can be used for computing a more general index to describe the overall operation of the forest machine, for example by using a weighted average. The index values for the different constituent functions are utilized for adjusting the different control parameters of the control system of the forest machine in an optimal way.

The characteristic value developed in the various embodiment examples of the invention can be used as a basis for the adaptive adjustment of the respective sawing system or feeding function or fuel economy or output or gripping of the log. The adaptive control will increase the output or reduce, for example, the fuel consumption by selecting automatically the optimal parameters for the different situations of use. The driver's work will become easier when the parameters do not need to be changed.

BRIEF DESCRIPTION OF THE DRAWINGS

Figure 4:
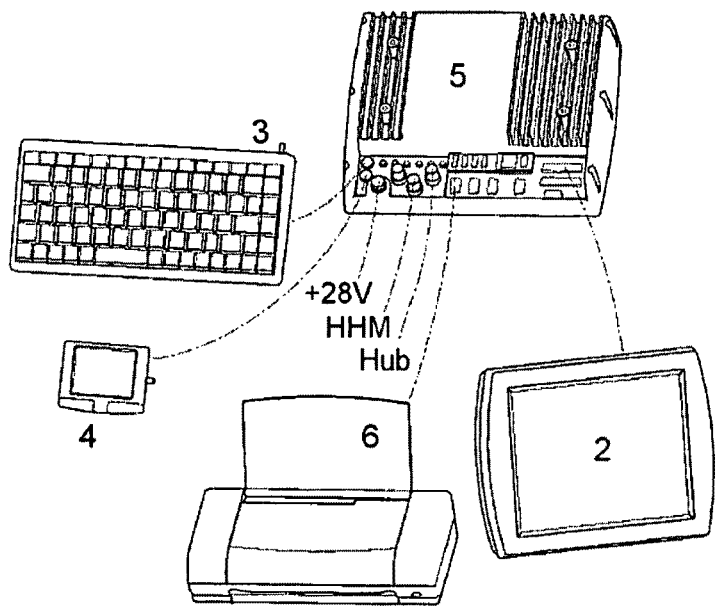
Figure 5:
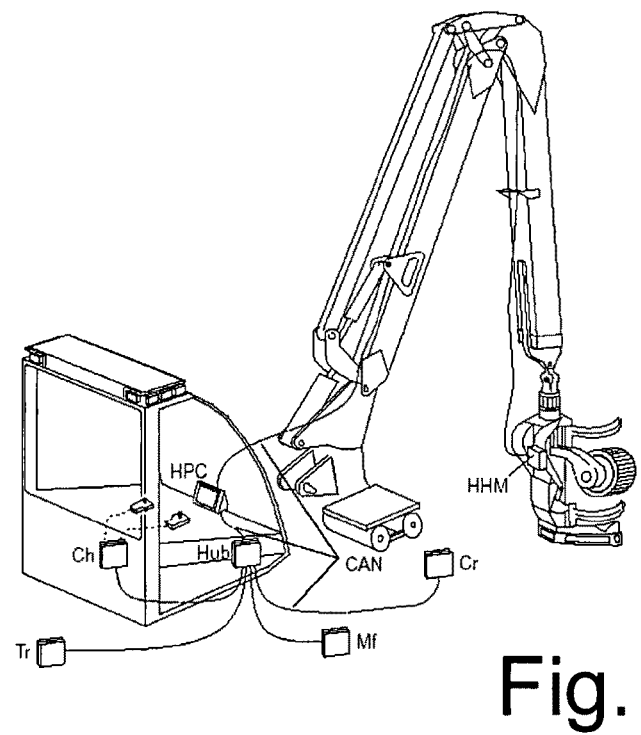
Figure 6:
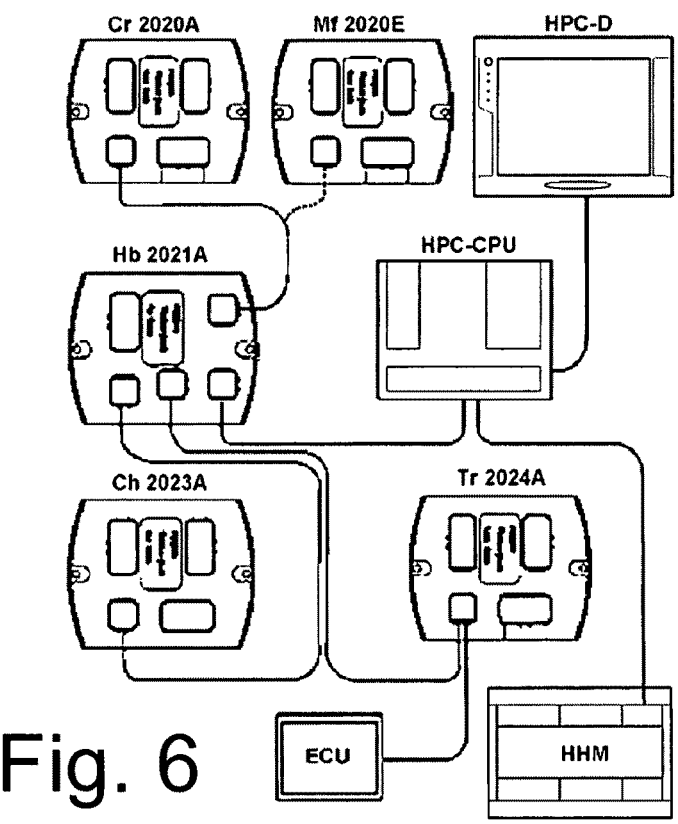
Figure 7:
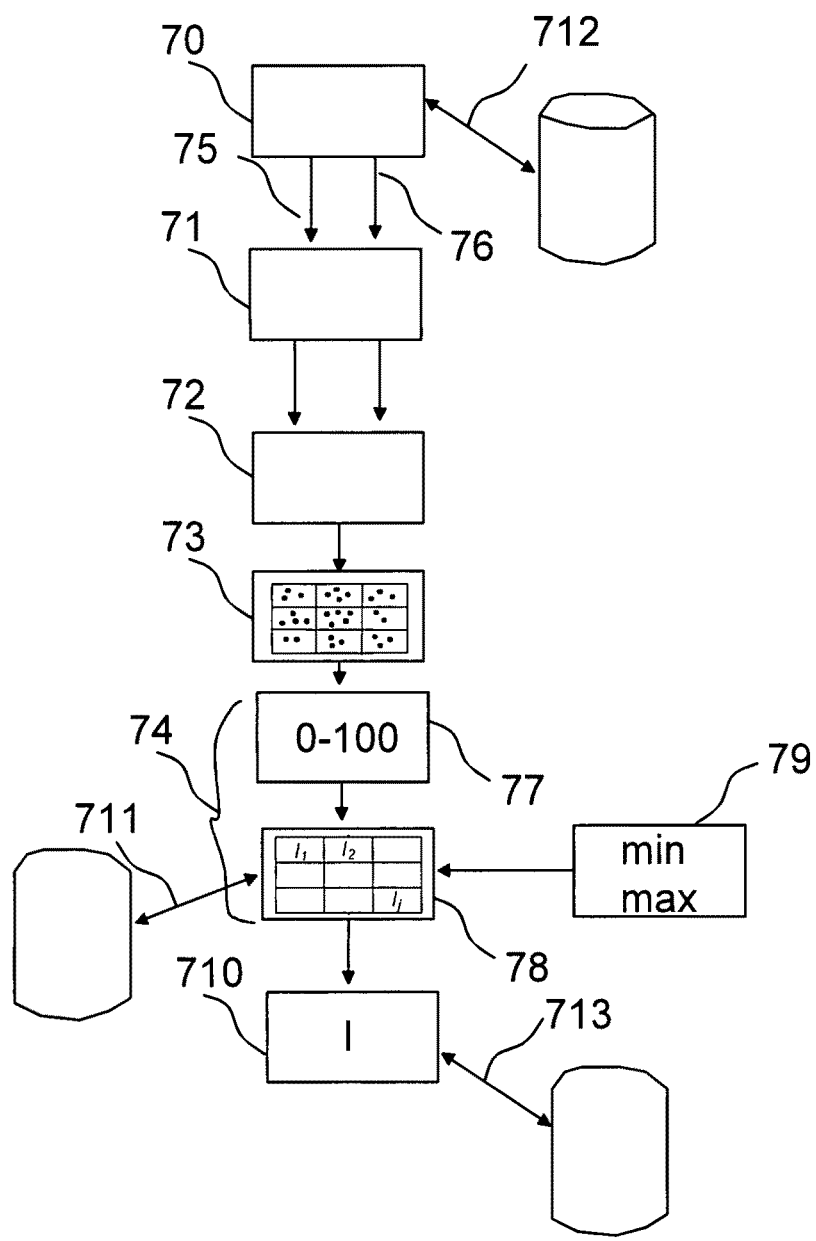
Figure 8:
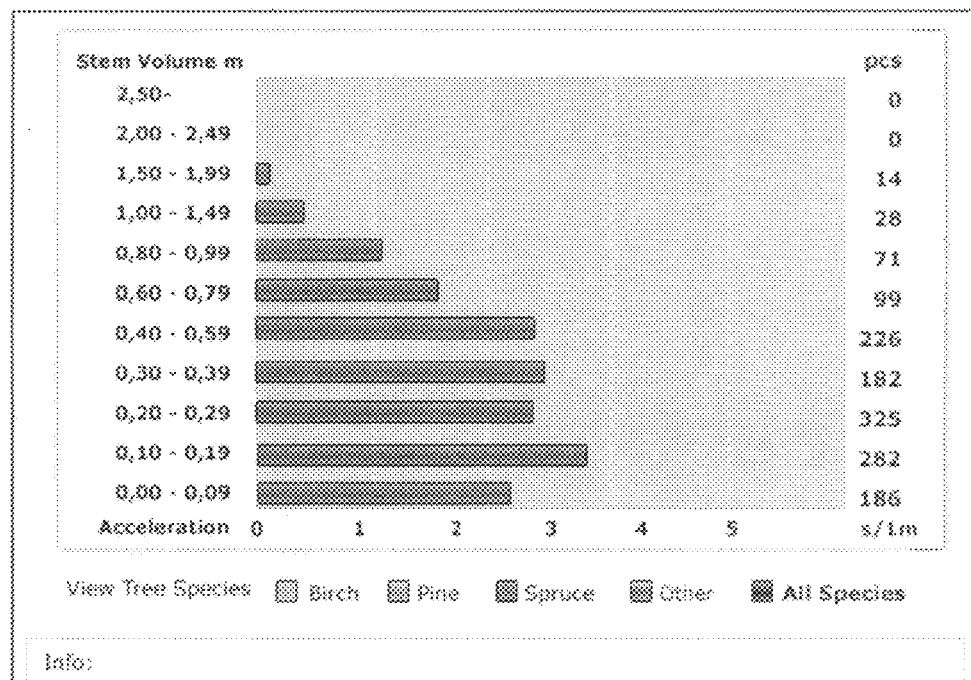
Figure 9:
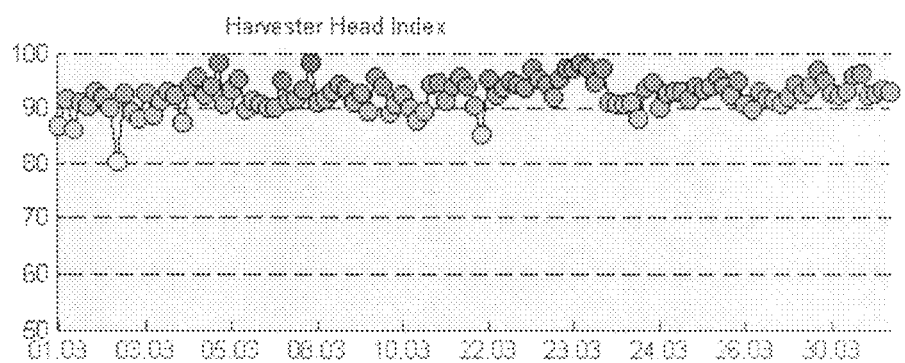
Figure 10:
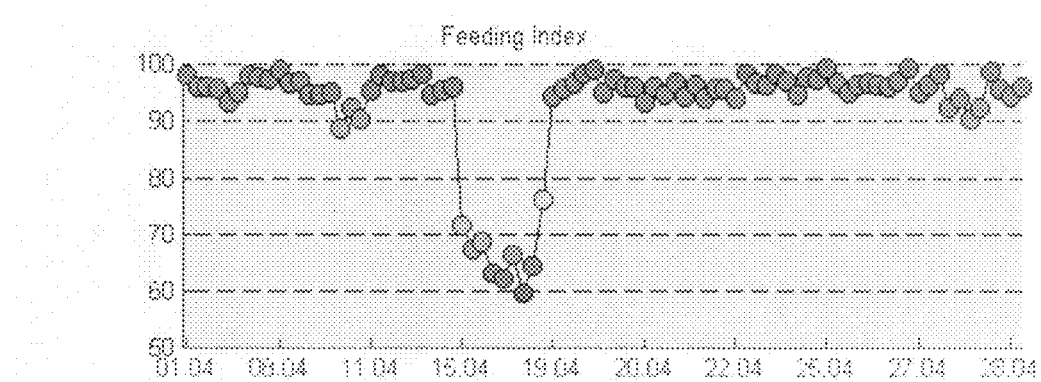
Figure 11:
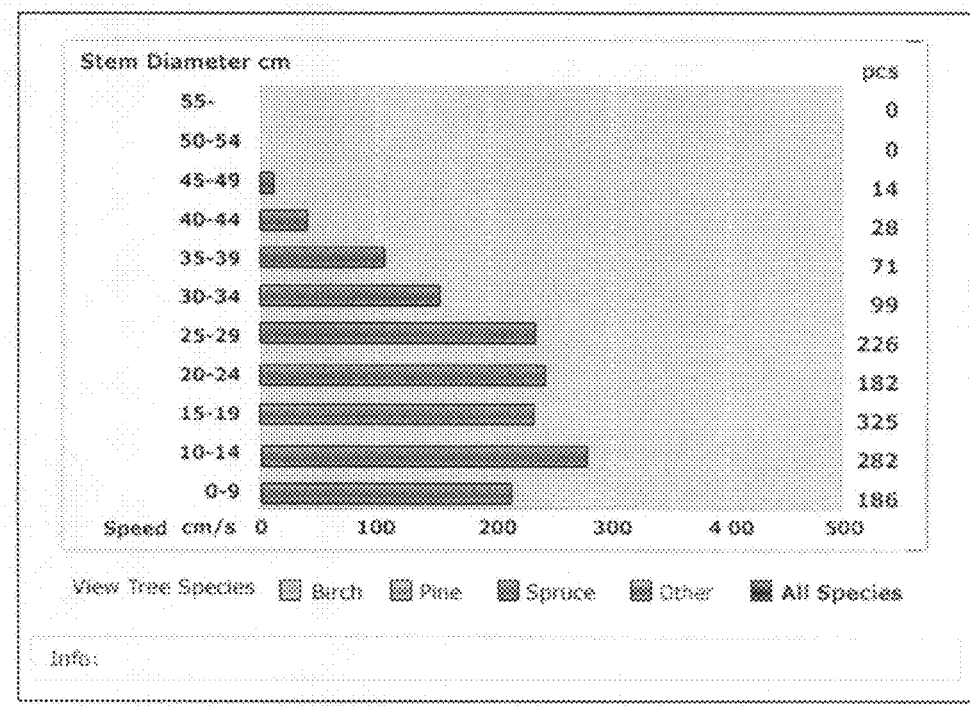
Figure 12:
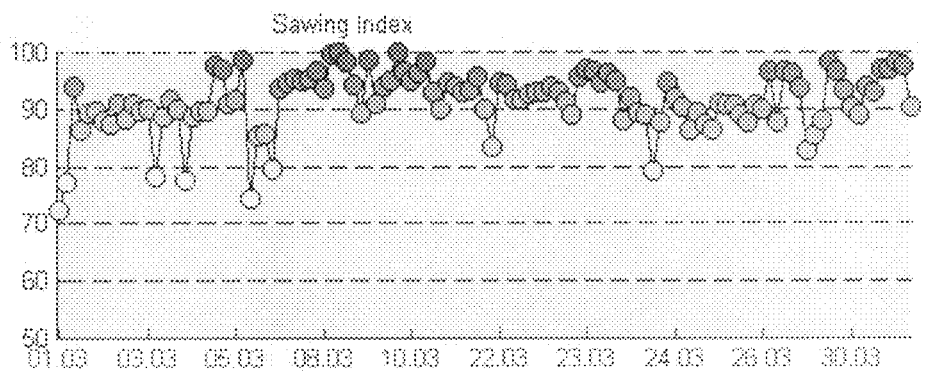
Figure 13:
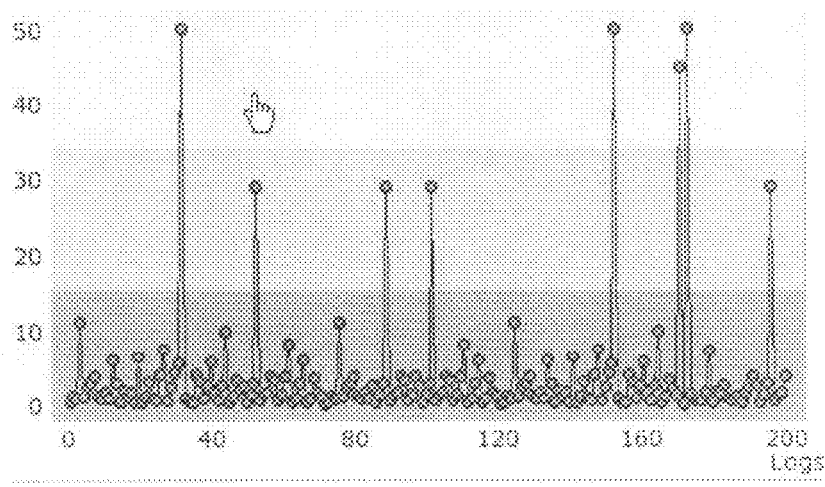
Figure 14:
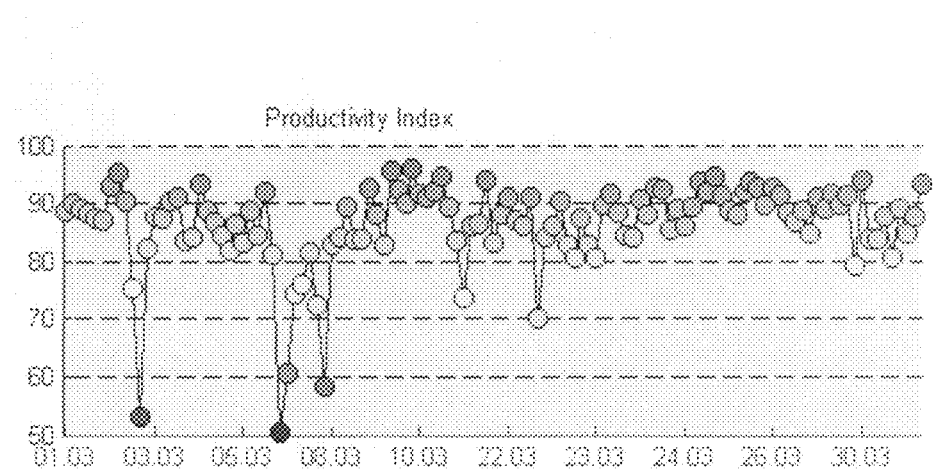
Figure 15:
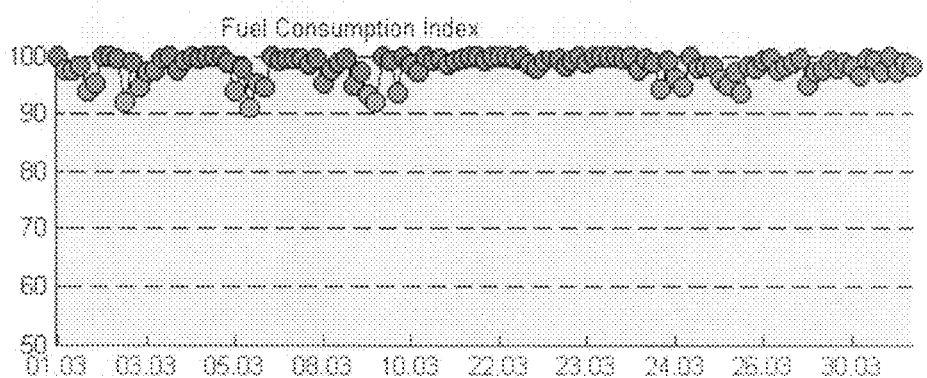

In the following, the invention will be described in more detail with reference to the appended drawings, in which:

FIG. 1 shows a forest machine which is a harvester and in which the invention is applied, FIG. 2 shows a harvester head, the invention being applied for monitoring its performance, FIG. 3 shows the cabin of a harvester and the equipment of a control system placed therein, FIG. 4 shows the equipment of FIG. 3 in more detail, FIG. 5 is a principle view showing the structure of a digital control and measuring system according to one embodiment of the harvester, in which the invention is applied, FIG. 6 shows the more detailed structured of the control and measuring system of FIG. 5, FIG. 7 shows the different steps of the method according to the invention in a flow chart, FIG. 8 shows the displaying and classification of data for the feeding function, FIG. 9 shows the displaying of history data of the index for the harvester head, FIG. 10 shows the displaying of history data of the index for the feeding function, FIG. 11 shows the displaying and classification of data for the feeding function, FIG. 12 shows the displaying of history data of the index for the sawing function, FIG. 13 shows the displaying of history data of the characteristic value for stem holding, FIG. 14 shows the displaying of history data of the output index, and FIG. 15 shows the displaying of history data of the index for the fuel consumption.

MORE DETAILED DESCRIPTION OF THE INVENTION

FIG. 1 shows a forest machine of prior art, which is the Timberjack 1070D harvester type known as such and in which the system according to the invention can be applied. The harvester is provided with frame steering, and it comprises a crane system whose end is provided with a harvester head for the processing of trunks. In this case, the control system of the harvester is Timbermatic 300, which is a PC based measuring and control system and in which the applications for measuring the performance according to the invention are built.

FIG. 2 shows, in more detail, a harvester head of prior art, several embodiments of the invention relating to its monitoring. The harvester head comprises upper delimbing blades 21, lower delimbing blades 210, feed rolls 23, a saw motor 26, members for feeding 29 a guide bar and for controlling its position, and a tilt function 211, which are all known as such. The harvester head is used for measuring the diameter of the trunk, typically by means of the upper delimbing blades, and for measuring the length by means of a measuring roll.

In FIGS. 3 and 4, the same numbering is used for the same elements. FIG. 3 shows, in more detail, the cabin of the harvester so that the placement of the equipment of the control system is illustrated better. FIG. 4, in turn, shows in more detail the components of said equipment. The equipment of the control system comprises control panels 1, a display module 2, a PC keyboard 3, a touchpad mouse 4, a central processing unit (HPC-CPU) with a processor and a memory 5, a printer 6, a hub module 7, and a seat module 8 (Ch). The characteristic value history of the system according to the invention is displayed to the user graphically on the display module. The structure of the graphical representation may vary, covering, for example in the 2-dimensional coordinate system, a large variety of curves or line segments, or bar diagrams or other illustrative representations, even a numerical representation or listing in table form, which is particularly suitable for printouts.

For implementing the various embodiments of the invention, the required application and the software included therein is installed in the central processing unit of the control system comprising the necessary RAM and mass storage. The applications are either installed in a new forest machine or retrofitted in an older forest machine, in which case the medium for transferring the applications is, for example, a CD-ROM. The required CD disc drive is provided, for example, in the display module. The control system utilizes an operating system known as such, under which the application is run.

The execution environment may consist of various computers with their operating systems, particularly the processor-based control systems of forest machines, i.e. harvesters, which are intended for running applications and software to serve the control system, in which case it may be particularly a personal computer (PC) installed in the forest machine, or a workstation operating as such and comprising an operating system suitable for the purpose. The equipment and the operating system comprise the applications and protocol means necessary for data transmission with other devices. The operating system is preferably a turnkey system of prior art, which even provides services ready for the transmission of a data stream in e.g. a CAN bus. The measuring and control system of the forest machine comprises the necessary control computer to run the computer program including the method according to the invention.

FIG. 5, in turn, is a more detailed view showing the structure of the digital control and measuring system of a forest machine and particularly a harvester, based on CAN (Controlled Area Network) bus technology and distributed control. The system consists of independent intelligent modules communicating via the CAN bus. The CAN bus technology enables a modular structure. The system is, for example, Timbermatic 300, which comprises a graphic user interface. The system controls the diesel engine, the hydrostatic drive transmission, the crane system, and the harvester head, as well as the auxiliary functions relating to these.

The system typically consists of six or seven modules in the CAN bus, shown in more detail in FIG. 6. The modules of the system include a display module HPC-D, the central processing unit HPC-CPU (Harvester PC-Computer Processor Unit) of the computer, and a bus distribution module Hub (Hub module), to which the other modules are directly connected, except for the display and a harvester head module. The harvester head module HHM (Harvester Head Module) processes and transmits all the control signals to and the measurement data from the harvester head. The harvester head module HHM is coupled directly to the central processing unit HPC-CPU. All the control devices needed for controlling the system are coupled to a chair module Ch. A crane module Cr is responsible for controlling the valves of the crane system. A transmission module Tr is responsible for the control and the communication of the diesel engine, the drive transmission and the auxiliary functions relating to the basic machine. A multifunction module Mf is optional, and ECU is an engine control unit for controlling and monitoring the functions of the engine. In a forwarder, the system comprises fewer modules but has a corresponding structure, for example with respect to the crane system, when the invention is also applied in forwarders.

The basic data measured for the various embodiments of the invention are obtained from a digital communication bus connecting the control system modules of the forest machine, normally a CAN bus in forest machines. The measuring software selects the required signals from the bus communication during normal use, time stamps them, and buffers them for further processing.

The measurements and signals of the control bus of the control system of the forest machine can be collected and stored in a database, and the measurement data can be classified trunk by trunk and log by log, using different volume size classes of processed timber. The measurement values can be collected according to certain conditions measuring the operating conditions of the forest machine, and calculated values can be processed and derived from the measurement data before they are stored in a database. For example, the performance and efficiency measurements of the harvester grapple are based on measuring the duration and functional speeds of different steps in the processing. The processing of a single trunk involves a large number of measurement values, and many of the measurements are strongly dependent on each other. Particularly when the performance of the forest machine is measured, a special problem is also the dependence of the measurement values on the working conditions and the driver's driving style.

The monitoring of a long-term trend in the technical performance of a forest machine or a harvester and a harvester head can be implemented by utilizing index value measurements of different constituent functions of the forest machine. In the measurement method, the initial data selected for the computation comprises such measurements of constituent functions of the forest machine whose measured values are not affected by the action of the driver of the machine. The most significant factor on measuring the technical operating condition and performance of the harvester is the loading level of the machine, which is proportional to the trunk size of processed trees. The effect of the volume of processed trunks on the different measurement values is compensated in selected measurements on the basic level. The data on the performance of the forest machine measured in various use conditions can be compared in an illustrative way, because the index values to be determined are as independent as possible of, for example, the trunk size distribution of a given stand marked for cutting. The index values can be used to display the most relevant information in a very compact form, that is, an overall view of the performance of the machine from multivariate measurement data and a large number of single measurements.

A sufficient quantity of statistically representative data is required for computing the indices (I) for the constituent functions of the forest machine, wherein a single index value can be computed from e.g. 100 (or 50 to 200) trunk measurements. When the index values are computed as an average from a sufficiently large number of trunk sizes, the performance measurement result will not be too sensitive to react to single deviating measurement results. Thus, single index values are comparable with each other, and the difference between the index values indicates directly a change in the performance of the constituent function of the harvester. On the basis of the index values it is possible to select, for reviewing the measurement data, accurately the period in which the performance of a given subsystem of the harvester has presumably changed. The actual causes of the change in the performance of the forest machine can be found by examining this more detailed measurement data on a given constituent function. The index measurements can be used as a part of the system for monitoring the condition of the forest machine. The index values measuring the different constituent functions of the forest machine are independent of each other, wherein a possible failure in a given constituent function can be localized more easily.

The index computation is particularly suitable for measuring variations in the technical performance of the forest machine. Total output is considered the most relevant measurement of the performance of the forest machine, and it can be computed, for example, as a function of the trunk size. Factors on the total output include the technical performance of the forest machine, the driver's working efficiency, and the variations in the conditions.

By index measurements of the different constituent functions it is also possible to determine the effect of the technical performance and the driver's working efficiency on the total output of the working machine. Initial values used for computing the index values include only indices measuring the technical performance of the forest machine, wherein the various indices can be used to evaluate, to which extent a possible change in the total output is an explicit result of a change in the technical performance.

The various constituent functions of the harvester, in which the invention is applied include e.g. the sawing function, the feeding function, the stem holding, the monitoring of the output, the monitoring of the drive transmission, the function of the crane system, and the monitoring of the fuel consumption. Particularly the monitoring of the drive transmission is also a constituent function relating to a forwarder.

The Computation of the Index Values

The implementation of the index computation may also be based on a hierarchic computation of the measurements, in which the values of the indices on the highest level of a subsystem in the forest machine are computed from the index values of the different constituent functions. For example, the index representing the total performance of the harvester grapple can be computed from several index values of constituent functions of the harvester grapple. The index values of the different constituent functions of the harvester grapple can also be utilized in the optical adjustment of the various control parameters of the harvester control system.

The starting point for the index computation is, for example, the determination of such indices measuring the technical performance of the harvester and the harvester grapple, which are sufficiently significant for the evaluation of the performance of the machine. Calculated indices derived from these measurements on the basic level are also used as input in the index computation.

In the following, the computation of the index values will be discussed by means of some suitable embodiments and examples of the invention. At the same time, reference is made to FIG. 7 which shows the method used in the computation, and the different steps therein. The index is computed in four steps which include the measuring 70, also including the storing 712 of the measurements e.g in a database, if necessary, the deletion 71 of abnormal measurement values, the classification 72 of the measurement data, the compensation 73 of the measurement data, and the computation 74 of the index, which also includes the scaling 77 of the index value and the utilization 78 of the maximum and minimum parameter values of the index values. The maximum and minimum parameter values are set in step 79 on the basis of e.g. fixed limit values or empirical data or the statistical properties of the measurement data. The computation also involves the storing 711 of the indices and the characteristic values from a desired period of time, after which the results are displayed in a desired form to the user. The computation steps can be taken in a variety of ways. In the comparison between alternative computation methods, the most important criterion is the reliability of the index. The presented computation solutions for determining various performance indices fulfill the criterion of reliability of a usable index. Alternative computation solutions can also be evaluated, for example, with regard to the computation capacity or memory space required of the central processing unit (HPC-CPU) of the computer hardware used.

Step: Measurement

We shall discuss the measurements 75 and loading data 76 used by various embodiments of the invention. The measurements are not limited solely to the presented examples.

In the embodiment of the invention, in which the sawing function is monitored (the saw motor 26, the feeding and position control member 29 for the guide bar), the basic measurements used are the sawing time, the cutting diameter and the wood species. The sawing time is determined from the time difference between a SAW command from the control system to the grapple control module (HHM) and a SAWING FINISHED signal from the grapple control module. The cutting diameter is read from a DIAMETER signal from the grapple control module. The wood species data is read from a WOOD SORT signal to be transmitted to the grapple control module.

In that embodiment of the invention, in which the feeding function is monitored (feed rolls 23), the basic measurements used are the feeding time of each log, which may be divided into several work cycle times, such as: acceleration time, constant feeding speed, the duration of braking step and the duration of the cross-cutting point step, and the serial number of the log. In addition to these, the total volume of the log is entered.

In that embodiment of the invention, in which the stem holding is monitored (upper delimbing blades 21 and lower delimbing blades 210), the basic measurements used are the length and diameter values obtained at intervals of about 10 cm during the feeding of each log. With reference to the stem holding, the log diameter profile is formed from the length and diameter values of each log. From this profile, exceptionally great changes in the diameter are identified. A statistical maximum is determined for the difference between two successive diameter locations, and exceeding this will mean a significant sudden movement of the delimbing blades. The total number of these sudden changes will form a log-specific index on stem holding. If the delimbing blades are loose, the problem is manifested by high index values. Too tight blades, in turn, will reduce the target value of the index.

In that embodiment of the invention, in which the output is monitored, the basic measurements used are the trunk diameter and length data obtained from the harvester grapple control module (HHM) as well as the durations of the different steps of processing the tree.

In that embodiment of the invention, in which the fuel economy is monitored, the basic measurements used are the total processing time of the trunk and the quantity of fuel used for the processing, for example in liters, or alternatively the fuel consumption as a continuous measurement in time during the processing, for example in liters per hour, from which it is possible to measure the fuel consumptions of the sawing function and the feeding function separately.

In that embodiment of the invention, in which the drive transmission is monitored, the CAN signals to be monitored include the pedal speed instructions, the selection of the driving direction, the instructions entered via a joystick, the rotation speed of the hydraulic motor, and the load factor describing the load of the diesel engine, as well as the oil temperature, and possibly also the pressure level of the drive transmission lines.

In that embodiment of the invention, in which the crane system is monitored, the basic measurements used are, for a harvester, the control signals and operating times of the joints of the forwarder for each log, as well as the diameter profiles and lengths of the logs. If the forest machine is equipped with the pressure measurement of the hydraulic system of the crane system, the pressure measurements are also entered. In forwarder use, the operating times of the joints of the crane system are measured for each step during the loading or unloading of a tree trunk. Furthermore, the weight of the lifted load, obtained from a load scale, and the pressure of the hydraulic system are entered, if the forest machine is equipped with the respective sensors. The load scale is coupled between the crane system and the harvester head, or in a forwarder between the crane system and the loading grapple.

Step: Deletion of Abnormal Measurement Values

In the next step of the index computation, abnormal measurement values, which are due to e.g. an abnormal operating situation or measurement errors, are deleted from the measurements of the basic level of the constituent functions. For each single measurement variable, an upper limit and a lower limit are set according to statistical average measurements or empirical data. An incorrect measurement relating to a single trunk or log is deleted, but the other measurements within allowable measurement limits are included in the computation.

We shall discuss this step with respect to the different embodiments of the invention.

For the sawing function, a lower limit and an upper limit are set for single sawing time measurements according to statistical averages and empirical data.

For the feeding function, a lower limit and an upper limit are set for the total feeding time of a log and for the times of partial steps according to statistical averages and empirical data. For the sawing function as well as the feeding function, a single incorrect measurement is deleted, but the measurements remaining between allowable limits are included in further computations.

In the monitoring of the output, a lower limit and an upper limit are set for the total duration of processing of single trunks according to statistical averages and empirical data. If the total duration of the processing of the trunk is outside these limits, the trunk is not taken into account in the computation of the index.

For the fuel economy, a lower limit and an upper limit are set for the fuel consumption measurements of single trunks according to statistical averages and empirical data. An incorrect measurement relating to a single trunk is deleted, but measurements falling within the allowed range are included in the further computation.

For the drive transmission, a measurement point is accepted, if the driving hydraulics is not in use, that is, if the joystick signals are not active, the driving direction is forward, and the rotation speed of the hydraulic motor is greater than a set threshold value. In addition to this, the value of the rotation speed of the hydraulic motor is examined and accepted for use, if it meets the set criteria. At the same time, the aim is to accept the measurement point only when the drive transmission is not in a dynamic change situation, so that errors caused by dynamics will not affect the computation.

For the crane system, upper and lower limits are set for the joint-specific performance times and for the total time according to statistical averages and empirical data. A single incorrect measurement is deleted, but measurements falling within the allowed range are included in the further computations.

Step: Classification and Compensation of Measurement Data

The measurement data of constituent functions, from which abnormal measurement values have been deleted, are processed in such a way that the effect of the working conditions on the measurement values will be compensated for. A compensation computation is used to normalize the performance measurements of the different steps of the working process of the forest machine in such a way that the measured performance is not dependent on, for example, the trunk size of the processed timber. Most of the trunk or log specific performance measurements should be compensated with respect to the remaining volume of the processed trunk or the type of the log.

The logs are classified according to the type into butt, intermediate and top logs. The log type data also indicates, to some extent, the branchiness of the processed log, which affects the loading of the processing of the harvester and, among other things, the processing speed.

Various basic measurement values are affected by different compensation factors, and one or more compensation factors may be used for each basic measurement. In addition to the remaining trunk volume and the log volume, it is also possible to use the total trunk volume, the wood species, or the number of logs cut from the trunk, as compensation factors.

When compensating for the effect of the trunk volume, a certain number of trunk size classes are selected for classifying the single measurements of the performance of the harvester. A separate index value is computed for each item of measurement data on the trunk size class, and the final index value is obtained by computing the weighted average from the index values of all the trunk size classes weighted by the number of the measurement values for each trunk size class.

We shall discuss the classification with respect to the different embodiments of the invention.

For the sawing function, the measured sawing times are classified according to the diameter and the wood species.

For the feeding function, the measured feeding times and partial work cycle times are classified according to the remaining volume and the log type, for each wood species. FIG. 8 shows one classification for the feeding function.

With reference to stem holding, the classification is made according to the log type and the remaining trunk volume.

The measured fuel consumption values are classified according to the trunk volume and the wood species.

With respect to the drive transmission, a condition index is computed, which is the ratio between the requested rotation speed of the hydraulic motor and the realized rotation speed. The condition index can be classified further according to the rotation speed, the temperature, and the loading range. The condition index matrix is updated by computing, for example, a new average.

In the determination of the output, the measured total durations of the processing are classified according to the trunk volume and the wood species. Furthermore, the delays due to the driver are deleted from the operation runs.

In the monitoring of the crane system, the measured joint times and total times are classified, in harvester use, according to the remaining trunk volume and the magnitude of the control signal used, as well as the measurement of hydraulic pressure, if this measurement is in use. In the case of a forwarder, the classification is made according to the operation (for example, lifting a load from the ground to the load and into the load space or unloading it from the load to a staple), according to the magnitude of the control signal used, and further according to scale data or pressure data, if these measurements are in use.

Step: Scaling the Index Value

Index measurements illustrate primarily a change in the performance of an individual forest machine. For the index measurements of a harvester grapple, for example a scale from 0 to 100 has been selected, wherein the high values represent an efficient function of the forest machine. For each measurement variable of the basic level of a constituent function, the limits for poor and good performance level must be computed, which are represented by the minimum and maximum limits of the actual index measurement. In the above example, the normal performance level of the forest machine is set at an index value of about 90, wherein it is also possible to present a possibly better performance level.

Alternatively, the normalized performance index value can only measure the relative change with respect to the performance level of the machine at the moment of starting the measurement. Thus, the lower and upper limits for the measurement variables of the constituent functions corresponding to the moment of starting the measurement are selected so that the index values are scaled, for example, with respect to the index value 100. When these fixed selected parameter limits are used for the index values, the index measurement may vary on both sides of the index value 100.

What is most important in the determination of the parameter levels for the measurement values is to use measurement data that is representative of the normal performance of the machine, and also that there is a sufficient number of measurements for each index type.

Step: Maximum and Minimum Parameter Values for the Index Values

The index values (I) are determined from the measurements of the different constituent functions. There are various possibilities to determine the correlations between the physical lower and upper limits of these measurement values and the index value scale from 1 to 100. The minimum and maximum parameter values used for the index values of the different constituent functions may be fixed selected performance values that are characteristic of a particular forest machine and harvester grapple model, or limit values of parameters identified by measurement data of a forest machine type and an individual forest machine. If the parameters for determining the performance level are selected to be fixed, a direct comparison between units of a particular forest machine type is possible.

The minimum and maximum parameter values of the index values of constituent functions that correspond to the normal or impaired performance are computed separately for each compensation class.

Some of the measurement variables used as the initial values for the index computation are significantly dependent on the mechanical-hydraulic properties and the power of the forest machine and the harvester head. On the other hand, some of the measurement values are such that, for the measurements of forest machines and harvester grapples with different properties, it is possible to use common, standardized limit values for good and poor performance; for example, the absolute total output of the forest machine does not affect the measurements of braking of the feeding function and the positioning accuracy of the harvester head. Both the forest machine type specific parameters and the standardized parameters can be determined, for example, statistically on the basis of measurement data from several welltuned forest machines.

Table 1 lists some examples of the above-mentioned characteristic values or indices of a harvester grapple, for which the limit values are determined either according to the type or by using a general standardized value. The parameters will be explained in more detail below.

TABLE 1

| Parameters specific to the forest machine type | Standardized parameters |
|---|---|
| AccelerationDelay | StartStuckPercentage |
| AccelerationTime | AccelerationStuckPercentage |
| AverageAutomaticFeedingSpeed | AutomaticFeedStuckPercentage |
| AverageManualFeedingSpeed | AutomaticFeedApproachTime |
| CuttingTime | AutomaticFeedApproachLength |
| MachineProductivity | BuckingSuccess |
| FuelConsumption | SearchTime |
| | PositivePositioningError |
| | NegativePositioningError |

We shall now discuss the application of the minimum and maximum parameter values in different embodiments of the invention.

With respect to the sawing function, the single measurements for each diameter class, and with respect to the feeding function, the single measurements for each volume class are scaled to the range from 0 to 100 according to the lower and upper limits allowed for each class. For each class, the average is computed from the computing cycle of a single characteristic value (for example, 100 logs). From the averages of the different classes, the final characteristic value is computed as a weighted average. The weighting factor is the number of measurements accumulated in the class.

With reference to the stem holding, the log diameter profile is formed from the length and diameter values of each log. From this profile, exceptionally great changes in the diameter are identified. A statistical maximum is determined for the difference between two successive diameter locations, and exceeding this will mean a significant sudden movement of the delimbing blades. The total number of these sudden changes will form a log-specific index on the stem holding. If the delimbing blades are loose, the problem is manifested by high index values. Too tight blades, in turn, will reduce the target value of the index.

FIG. 13 shows the index for each one of 200 trunks (Logs). The problems are manifested as high index values, and on the other hand, index values smaller than the predetermined target value represent a too intensive correction of the situation. In general, a target value can be determined for the indices, or a range which is also shown in the graphic representation.

With respect to monitoring the output, the crane system or the fuel economy, the single measurements for each trunk size class are scaled to the range from 0 to 100 according to class-specific allowed lower and upper limits. For each class, the average is computed from the computing cycle of a single characteristic value (for example, 100 trunks). From the averages of the different classes, the final characteristic value is computed as a weighted average. The weighting factor is the number of measurements accumulated in the class.

For the drive transmission, for example the first months of operation determine a given reference level, wherein the values entered may be monitored, for example, on a monthly basis.

The identification of the limit values for the minimum and maximum level of the performance of the constituent functions from the measurement data may be computed at intervals on the basis of selected reference data, or the parameters may also be computed dynamically so that the computing system will automatically detect a permanent change in the performance level, and the index values are automatically scaled to correspond to this changed operating condition of the forest machine. Such a bias of the performance measurement of a given constituent function of the forest machine may be caused, for example, by the fact that the measurement data used in the computing of the parameters does not represent the normal operation of the forest machine, or the performance of some component in a particular forest machine has been adjusted or the whole component has been replaced by one with different properties (for example, the feeding motors of the harvester grapple).

Step: Computing the Total Index Value

FIG. 7, step 710, illustrates the computation of the total performance index of a forest machine. Said index or characteristic value is stored 713 for the presentation of history data. If desired, the index of total performance can be computed from several indices of constituent functions, but some indices of constituent functions as such will already give an overall view of the function; examples to be mentioned include the indices representing the output and the fuel consumption.

For example, the index representing the total performance of the harvester grapple can be computed from several index values of constituent functions of the harvester grapple. For example, a harvester head total performance index (HARVESTER HEAD INDEX) is computed as weighted averages from the following constituent functions of the harvester grapple: acceleration index (ACCELERATION INDEX), feeding index (FEEDING INDEX), index for the effect of stops and reversals of the feeding (BUCKING INDEX), index for the positioning accuracy of the cross-cutting point (AUTOMATIC POSITIONING INDEX), and cross-cutting index (SAWING INDEX.)

Also other indices may be compiled to form various total performance indices.

The weighting coefficients used in the above-mentioned computation of the average are determined on the basis of the ratios of significance of the various constituent functions. The average proportion of single constituent functions from the total processing time of the harvester grapple can be determined from the different statistically measured work cycle times of processing. FIG. 9 shows one example of history data in a harvester, namely the total performance index of the harvester head (HARVESTER HEAD INDEX), where the time span is one month and each dot corresponds to 100 trunks.

We shall now discuss the characteristic values measuring the performance of constituent functions, and the indices to be determined on the basis of them, as pointed out in the preceding embodiments. The characteristic values and indices are based on data obtained from the control and measurement automatics of the control system of a forest machine.

Embodiment Example

Feeding Function of the Forest Machine (FEEDING INDEX)

First of all, we shall discuss the characteristic values and indices relating to the harvester head, which can be taken as examples for the evaluation of the performance. The indices are on various levels, and two or more indices of a lower level are utilized for an index of an upper level.

A StartStuckPercentage index illustrates the frequency of stucking of the feeding of a trunk at starting. In the above-described compensation computation, the remaining volume of the trunk (StemVolumeLeft) and the type of the log (Log-Type) are taken into account. The StartStuckPercentage index is computed from a StartStuck characteristic value which gives the number of stuckings. The lower the average of the characteristic value, the higher the index value.

An AccelerationStuckPercentage index illustrates the frequency of stucking of the feeding of a trunk during acceleration. The compensation is the remaining volume of the trunk (StemVolumeLeft). The AccelerationStuckPercentage index is computed from an AccelerationStuck characteristic value which gives the number of stuckings. The lower the average of the characteristic value, the higher the index value.

An AccelerationDelay index illustrates the delay of starting of the feeding (from 0 to 0.1 m). The AccelerationDelay index is computed from an AccelerationDelay characteristic value which gives the delay. The lower the average of the characteristic value, the higher the index value.

An AccelerationTime index illustrates the time of acceleration of the feeding (from 0.1 to 1 m). The compensation is the remaining volume of the trunk (StemVolumeLeft) and the type of the log (LogType). The AccelerationTime index is computed from an AccelerationTime characteristic value which gives the time of acceleration. The lower the average of the characteristic value, the higher the index value.

A combined ACCELERATION INDEX is obtained by combining the constituent function indices StartStuck, AccelerationStuck, AccelerationDelay and AccelerationTime.

An AverageAutomaticFeedingSpeed index represents the feeding speed measured in the automatic feeding mode. The compensation is the remaining volume of the trunk (StemVolumeLeft) and the type of the log (LogType). The AverageAutomaticFeedingSpeed index is computed from values of the AvgSpeed (average feeding speed) greater than zero measured in the automatic feeding mode. The higher the average of the characteristic value, the higher the index value.

An AverageManualFeedingSpeed index represents the feeding speed measured in the manual feeding mode. The compensation is the remaining volume of the trunk (StemVolumeLeft) and the type of the log (LogType). The AverageManualFeedingSpeed index is computed from values of the AvgSpeed (average feeding speed) greater than zero measured in the manual feeding mode. The higher the average of the characteristic value, the higher the index value.

An AutomaticFeedStuckPercentage index represents the frequency of stucking of the feeding at the maximum speed. The compensation is the remaining volume of the trunk (StemVolumeLeft) and the type of the log (LogType). The AutomaticFeedStuckPercentage index is computed from a FeedStuck characteristic value which gives the number of stuckings. The lower the average of the characteristic value, the higher the index value.

FIG. 8 shows a classification, in which the acceleration of the feeding function has been examined taking into account the StemVolumeLeft and the wood species, that is, birch (Birch), pine (Pine) or spruce (Spruce). In the figure, the classification is illustrated for birch, and the total number of feedings corresponding to each volume is illustrated in the right column of the table. The table of FIG. 8 is, for example, a part of the index monitoring of the feeding function of a harvester and thereby also a part of the index monitoring of the total performance of the harvester grapple. Comparing with the minimum and maximum values, it is also possible to form a separate index for this examination, to be a part of an index of a higher level. The table of FIG. 8, as well as the graph of FIG. 10, which is a good illustration of the trend of the performance index, are displayed to the user in the user interface (UI) of a display device.

In this example, the combined feeding index (FEEDING INDEX) is obtained by combining the indices ACCELERATION INDEX, AverageAutomaticFeeding Speed, AverageManualFeedingSpeed, and AutomaticFeedStuckPercentage. FIG. 10 shows history data of the combined feeding index in a harvester, the time span being one month and each dot corresponding to 100 trunks.

Embodiment Example

Effect of Stoppings and Reversals of the Feeding (BUCKING INDEX)

An AutomaticFeedApproachTime index represents the approaching time from the moment of starting to break the feeding to the moment of stopping in a cross-cutting window. The compensation is the remaining volume of the trunk (StemVolumeLeft). The AutomaticFeedApproachTime index is computed from the values of the ApproachTime characteristic value computed in the automatic feeding mode. The lower the average of the characteristic value, the higher the index value.

An AutomaticFeedApproachLength index represents the approaching length from the point of starting to break the feeding to the point of stopping in the cross-cutting window. The compensation is the remaining volume of the trunk (StemVolumeLeft). The AutomaticFeedApproachLength index is computed from the values of the ApproachLength characteristic value computed in the automatic feeding mode. The lower the average of the absolute values of the characteristic value, the higher the index value.

A BuckingSuccess index represents the reversals and stoppings of the feeding caused by a change in the selection of feeding length. The Bucking Success index is computed from the values of the BuckingChangeCount characteristic value computed in the automatic feeding mode. The lower the average of the characteristic value, the higher the index value.

A combined index to measure the effect of stoppings and reversals of the feeding (BUCKING INDEX) is obtained by combining the AutomaticFeedApproachTime, AutomaticFeedApproachLength and Bucking Success indices.

Embodiment Example

Index for the Accuracy of Positioning of the Cross-Cutting Point (AUTOMATIC POSITIONING INDEX)

A SearchTime index represents the time of searching the cross-cutting point during the feeding. The compensation is the remaining volume of the trunk (StemVolumeLeft) and the type of the log (LogType). The SearchTime index is computed from the values of the SearchTime characteristic value computed in the automatic feeding mode. The lower the average of the characteristic value, the higher the index value.

A PositivePositioningError index represents a positioning error resulting from too long a feeding. The PositivePositioningError index is computed from the values of a PositioningError characteristic value between 0 and 0.25 m computed in the automatic feeding mode. The lower the average of the characteristic value, the higher the index value.

A NegativePositioningError index represents a positioning error resulting from too short a feeding. The NegativePositioningError index is computed from the values of a PositioningError characteristic value between −0.25 and 0 m, computed in the automatic feeding mode. The lower the average of the absolute values of the characteristic value, the higher the index value.

A combined index for the positioning accuracy of the cross-cutting point (AUTOMATIC POSITIONING INDEX) is obtained by combining the SearchTime, Positive PositioningError, and NegativePositioningError indices.

Embodiment Example

Sawing Function of the Harvester Head (SAWING INDEX)

A Cross-CutTime index represents cross-cutting. A CuttingTime index is computed from the difference between a theoretical cross-cutting time, computed on the basis of the cross-cutting diameter (CuttingDiam), and the measured cross-cutting time (CuttingTime). The theoretical cross-cutting time of the saw can be determined, for example, as a function of the cross-cutting diameter. The necessary characteristic values can be identified according to measurement data. The shorter the measured cross-cutting time, the higher the index value.

FIG. 11 shows a classification, in which the speed of the sawing function has been examined, taking into account the thickness of the trunk (Stem Diameter) and the sort of wood, that is, birch (Birch), pine (Pine) or spruce (Spruce). In the figure, the classification is illustrated for spruce, and the total number of sawings corresponding to each diameter range is illustrated in the right column of the table.

The sawing index (SAWING INDEX) is obtained from the Cross-CutTime index. FIG. 12 shows history data of the sawing index in a harvester, the time span being one month and each dot corresponding to 100 logs.

Embodiment Example

Output of the Harvester Head (MACHINE PRODUCTIVITY INDEX)

We shall now discuss characteristic values and indices relating to the output of the harvester head, which can be used as examples.

A machine productivity index (MACHINE PRODUCTIVITY INDEX) represents the output corresponding to the effective processing time of the harvester head. The effective processing time is the summed active time of the feeding and sawing functions of all the logs in a trunk. The technical output capacity of the harvester head is computed, trunk by trunk, from the trunk volume and the effective processing time. The compensation is the trunk volume (StemVolume). A MachineProductivity index is computed from an EffectiveProductivity characteristic value. The higher the average of the characteristic value, the higher the index value. FIG. 14 shows history data of the harvester head productivity index in a harvester, the time span being one month and each dot corresponding to 100 trunks.

Embodiment Example

Index of Fuel Consumption of the Harvester Head (FUEL CONSUMPTION INDEX)

We shall now discuss characteristic values and indices relating to the fuel consumption caused by the harvester head, which can be used as examples.

The fuel consumption index (FUEL CONSUMPTION INDEX) represents the fuel quantity used for the processing of a whole trunk. The compensation is the trunk volume (StemVolume). The FuelConsumption index is computed from the ProcessingTime and FuelConsumption characteristic values of a trunk. The lower the average of the fuel consumption, the higher the index value. FIG. 15 shows history data of the fuel consumption index of a harvester head, the time span being one month and each dot corresponding to 100 trunks.

The invention can be applied in a variety of ways for monitoring different functions of a forest machine, wherein information is obtained from a sufficiently long time to support decisions. The presented system and method is not only suitable for a harvester but it can also be used in forwarders, particularly for monitoring the drive transmission. In forwarders, it is also possible to monitor, for example, the condition and function of the crane system, as well as the fuel economy. For example, the indices can be displayed to the user in an illustrative way and used to support decisions.

The invention is not limited solely to the examples presented above, but it may vary according to the appended claims.

The invention claimed is:

1. A method for monitoring the performance of a subsystem or function of a forest machine, comprising the steps of:
    performing processing of several tree trunks by a harvester head connected to the forest machine, and
    in the forest machine:
        taking measurements during the processing of each trunk to find out a trunk size class specific to the trunk being processed,
        collecting, during the processing of said trunk, measurement data associated with said trunk and relating to operation of a subsystem or performing of a function,
        continually collecting said measurement data for several trunks during the processing of said several trunks,
        making a division of said collected measurement data into several trunk size classes to compensate for processing conditions, wherein the division is based on the trunk size class of the trunk said collected measurement data is associated with,
        computing at least one characteristic value for said several trunks, wherein the computation takes place on the basis of the measurement data divided into the trunk size classes, to describe the performance of said subsystem or function,
        repeatedly computing the characteristic value, and
        storing the time history of the computed characteristic value in the form of a performance history of the forest machine.

2. The method according to claim 1, comprising displaying the time history in the form of an illustrative graphic presentation to the user, wherein the time history shows the variation in time of the computed characteristic value.

3. The method according to claim 1, wherein the forest machine comprises a control system and a display module connected to the same, and the displaying comprises displaying said illustrative graphic representation by said display module.

4. The method according to claim 1, wherein the forest machine comprises a control system and a control bus connected to the same, and said measurement data comprises messages and measurements to be transmitted in said control bus.

5. The method according to claim 1 comprising computing a characteristic value describing total performance, wherein the computing takes place on the basis of computed characteristic values of several different subsystems or functions.

6. The method according to claim 1, wherein the computed characteristic value is an index value, the method comprising determining a separate index value for each trunk size class and computing a final index value based on the separate index values, for monitoring the performance of the function.

7. The method according to claim 1, comprising monitoring a sawing function of the forest machine by monitoring speed of the sawing function and computing the characteristic value for the sawing function.

8. The method according to claim 1, comprising monitoring a feeding function of the forest machine by monitoring speed or acceleration of the feeding function and computing the characteristic value for the feeding function.

9. The method according to claim 1, comprising monitoring a stem holding function of the harvester head of the forest machine by monitoring continually the trunk size class, and computing the characteristic value for the stem holding function.

10. The method according to claim 1, comprising monitoring the output function of a harvester head of the forest machine by monitoring continually durations of work cycles to be processed and computing the characteristic value for the output function.

11. The method according to claim 1, comprising computing the characteristic value as an average for said several trunks.

12. The method according to claim 1, comprising monitoring fuel consumption of the forest machine by monitoring continually the quantity of fuel consumed for the processing of a trunk and computing the characteristic value for that function.

13. The method according to claim 1, comprising monitoring operation of a crane system of the forest machine by monitoring operating times of joints of the crane system, work cycle by work cycle.

14. The method according to claim 1, comprising carrying out the computation in real time to process the measurement data, computing the characteristic value for the function to find out the performance, and storing the characteristic value to display the performance history to the user.

15. The method according to claim 1, wherein the trunk size class for each trunk is based on a diameter of that trunk, or a total volume of that trunk, or a remaining volume of that trunk.

16. A computer software product comprising a computer-readable medium and program code means stored in the computer-readable medium, wherein the computer software product is arranged to execute the steps of the method according to claim 1, when said computer program is run in a control computer.

17. The computer software product according to claim 16, wherein said control computer is the central processing unit of the control system of a forest machine.

18. A system for monitoring the performance of a subsystem or a function of a forest machine, comprising:

a control system arranged to control said subsystem or said function, wherein:

the control system is arranged to control processing of several trunk by a harvester head connected to the forest machine, the control system is arranged to take measurements during the processing of each trunk to find out a trunk size class specific to the trunk being processed, the control system is arranged to collect, during the processing of said trunk, measurement data associated with said trunk and relating to operation of said subsystem or performing of said function, the control system is arranged to continually collect said measurement data for several trunks during the processing of said several trunks, the control system is arranged to make a division of said collected measurement data into several trunk size classes to compensate for processing conditions, wherein the division is based on the trunk size class of the trunk said collected measurement data is associated with, the control system is arranged to compute at least one characteristic value for said several trunks, wherein the computation takes place on the basis of the measurement data divided into the trunk size classes, to describe the performance of said subsystem or function, the control system is arranged to repeatedly compute the characteristic value, and the control system is arranged to store the time history of the computed characteristic value in the form of a performance history of the forest machine.

19. The system according to claim 18, comprising a control bus arranged to operate under the control of the control system and to transmit said measurement data relating to the performance.

20. The system according to claim 18, wherein the control system is arranged to display the time history in the form of an illustrative graphical representation to the user, and the time history shows the variation in time of the computed characteristic value.

21. The system according to claim 20, comprising a display module related to the control system, for displaying said illustrative graphical representation.

22. The system according to claim 19, wherein said forest machine is a harvester and said control bus is a CAN bus.

23. The system according claim 18, wherein the control system is arranged to compute the characteristic value as an average for said several trunks.

24. The system according to claim 18, wherein the computed characteristic value is an index value, and the control system is arranged to determine a separate index value for each trunk size class and to compute a final index value based on the separate index values, for monitoring the performance of the function.

25. The system according to claim 18, wherein the control system is arranged to compute a characteristic value describing total performance, based on computed characteristic values of several different subsystems or functions.

* * * * *

UNITED STATES PATENT AND TRADEMARK OFFICE
CERTIFICATE OF CORRECTION

| | | |
|---|---|---|
| PATENT NO. | : 8,521,353 B2 | Page 1 of 1 |
| APPLICATION NO. | : 11/921395 | |
| DATED | : August 27, 2013 | |
| INVENTOR(S) | : Arto Peltomaa et al. | |

It is certified that error appears in the above-identified patent and that said Letters Patent is hereby corrected as shown below:

Title Page:
Item (75) Inventor Arto Reltomaa is spelled incorrectly, it should read Arto Peltomaa Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,521,353 B2                                    Page 1 of 1
APPLICATION NO.    : 11/921395
DATED              : August 27, 2013
INVENTOR(S)        : Arto Peltomaa et al.

It is certified that error appears in the above-identified patent and that said Letters Patent is hereby corrected as shown below:

Title Page:

Item (12), delete "Reltomaa" and insert -- Peltomaa --.

Item (75) Inventor Arto Reltomaa is spelled incorrectly, it should read Arto Peltomaa.

This certificate supersedes the Certificate of Correction issued April 29, 2014.

Signed and Sealed this
Twentieth Day of May, 2014

Michelle K. Lee
*Deputy Director of the United States Patent and Trademark Office*